May 2, 1972 C. E. HEMMINGER 3,660,520
INTEGRATED OXYDEHYDROGENATION AND ALKYLATION PROCESS
Filed Feb. 18, 1970
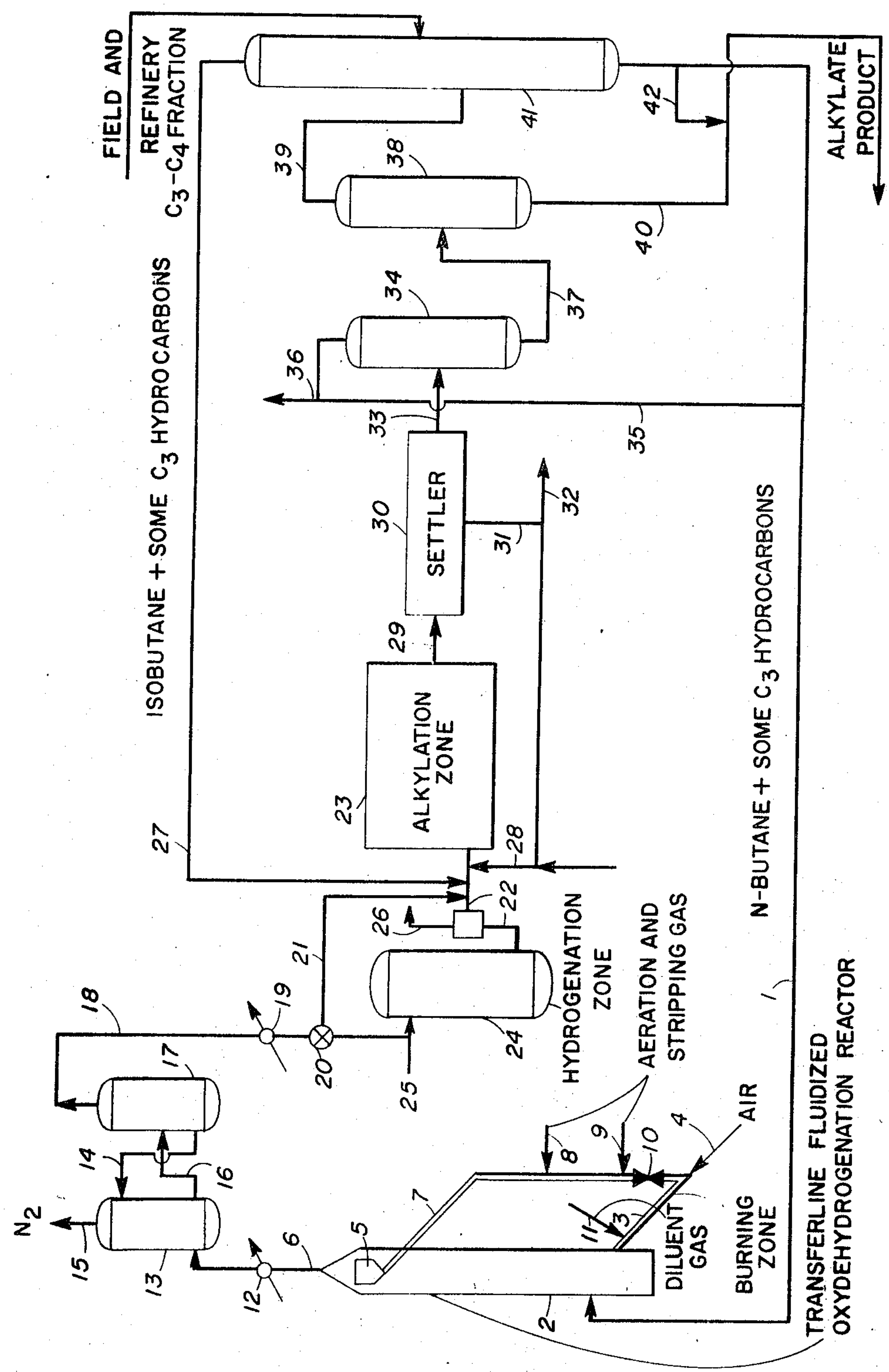
C. E. Hemminger Inventor
By C. W. Grady Attorney United States Patent Office 3,660,520

Patented May 2, 1972

3,660,520

INTEGRATED OXYDEHYDROGENATION AND ALKYLATION PROCESS

Charles E. Hemminger, Peapack, N.J., assignor to Esso Research and Engineering Company Filed Feb. 18, 1970, Ser. No. 12,224
Int. Cl. C07c 3/52, 3/54
U.S. Cl. 260—683.43 7 Claims

ABSTRACT OF THE DISCLOSURE

A saturated $C_3$–$C_4$ hydrocarbon feed is dehydrogenated with an oxygen-containing gas and a fluidized catalyst, such as, bismuth phosphate on activated alumina, vanadium oxide or bismuth oxide, to form $C_3$ and $C_4$ monoolefins. The olefin fraction is then alkaylated with isoparaffin and a catalyst, such as $H_2SO_4$, HF or zeolites. The olefin fraction may be hydrogenated prior to alkylation to convert any butadiene formed in the dehydrogenation reaction to butene.

The advent of the hydrocracking process has made available large quantities of propane and butane. At the same time, additional supplies of these hydrocarbons are becoming available from field gas plants in which the more easily liquefied hydrocarbons are removed from natural gas.

A number of processes are available for dehydrogenating $C_3$ and $C_4$ paraffins to olefinic materials. One well-known commercial method is the Houdry process. This is a high temperature endothermic process requiring a high investment with high operating costs.

Catalytic oxydehydrogenation is more attractive than thermal catalytic dehydrogenation because no reaction heat needs to be added and also because continuous operations are feasible. The heat of reaction of dehydrogenation is obtained by consuming part of the hydrogen produced in dehydrogenation. A part of the hydrogen from dehydrogenation reacts with oxygen to form water. Since water is thermodynamically stable, the reaction is not equilibrium limited and atmospheric pressure can be employed.

The $C_3$–$C_4$ fraction from sources in the refinery such as the hydrocracking unit or the gas plant and from field sources is fed into the isobutane tower downstream from the alkylation plant. Isobutane and propane are taken overhead from the tower and these gases are sent to the alkylation reactor. The bottoms from the tower are fed to the oxydehydrogenation reactor.

The invention will be more fully described below in conjunction with the drawing which is a diagrammatic flow sheet of the overall process.

Briefly stated, the preferred embodiment of the invention comprises the steps of (a) separation of a $C_3$–$C_4$ saturated hydrocarbon feed into an iso $C_4$+$C_3$ fraction and a normal $C_4$ fraction; (b) oxydehydrogenation of the latter fraction plus recycle propane to provide butenes, butadiene and propylene; (c) hydrogenation to convert the diene to butene; (d) alkylation of isobutane with butenes and propylene; (e) separation of $C_8$ paraffinic alkylate; and (f) recycle of unreacted hydrocarbons as required.

The oxydehydrogenation step involves contacting a hydrocarbon fraction containing a major amount of normal butane with oxygen in the vapor phase at a temperature in the range of 850° to 1350° F. and a pressure in the range of 1 to 100 p.s.i.g. The reaction is carried out in a continuous fluidized catalyst system with continuous regeneration of the catalyst. Preferably both the oxydehydrogenation reaction and the regeneration step are carried out in transferline type reaction zones.

Referring to the drawing, a feedstock containing a major amount, i.e., 50 to 95%, of n-butane and a minor amount of $C_3$ hydrocarbons is fed by line 1 into oxydehydrogenation reactor 2. The source of the feedstock will be discussed subsequently in this specification. Fluidized regenerated catalyst is fed to the reactor by line 3. The mixture of catalyst and vaporized feed passes upwardly through the reactor in the form of a relatively dilute fluidized suspension at a velocity in the range of from about 6 to about 50 feet per second and a space velocity in the range of 0.2 to 2.0 v./v./hr. The length-to-diameter ratio (L/D) of the reactor ranges from about 4 to about 50. The oxygen employed in reactor 2 can be supplied to the reaction zone in any suitable manner. Conveniently, oxygen is supplied as an oxygen-containing gas such as air by line 4. Effluent from the fluidized transferline oxydehydrogenation reactor passes into a plurality of cyclones shown generally by reference numeral 5. Dehydrogenated products are recovered overhead by line 6 and catalyst separated in the cyclones is recycled by lines 7 and 3. The vertical portion of line 7 serves as a catalyst standpipe and the catalyst is fluidized and stripped with a suitable aeration and stripping gas supplied by lines 8 and 9. Valve 10 is used to meter the desired quantity of catalyst into line 3 for regeneration and reuse. Line 3 is employed as a burning zone to burn carbon from the surface of the catalyst. For the oxydehydrogenation reaction the mole ratio of oxygen to aliphatic hydrocarbon feed can vary between about 0.3:1 and about 0.6:1, and preferably it is about 0.4:1. An inert diluent gas can be supplied to line 3 by line 11 to adjust the oxygen content of the gas in reactor 2 to the range set forth above.

It should be noted that the oxydehydrogenation system disclosed above provides a means of quickly converting the butane to the monoolefin in a short contact time reactor. Since the catalyst is regenerated continuously, it has a high activity in the reaction zone at all times.

A number of catalysts have been found to be suitable for the oxydehydrogenation reaction. Catalysts should be selective to the formation of monoolefins rather than diolefins. Catalysts selected from the group consisting of chromium phosphate on activated alumina, bismuth phosphate on activated alumina, vanadium oxide, bismuth oxide and molybdenum oxide are preferred or mixtures of the last three oxides and chromium phosphate on activated alumina is the most preferred catalyst.

Oxydehydrogenation effluent in line 6 is cooled in cooler 12 to a temperature in the range of 100° to 130° F. and passed into absorber tower 13. An absorber oil comprising, for example, a paraffinic hydrocarbon fraction boiling in the range of from about 300° to 500° F. from line 14 passes downwardly through the tower, absorbing the olefin fraction. Gases such as nitrogen and other low molecular weight materials pass upwardly through tower 13 and are removed by line 15. The olefin rich absorber oil passes via line 16 to desorber tower 17. The olefins are separated overhead from tower 17 by line 18 and cooled in cooler 19 if necessary. The absorption-desorption process is preferably operated at a temperature in the range of 100° to 130° F. and a pressure in the range of 1 to 100 p.s.i.g. The separation method described above is only one means of separating gases from the olefins, and any other suitable gas-liquid separation means can be employed.

Since the butenes from oxydehydrogenation may be contaminated with considerable amounts of butadiene and some oxygenated compounds, it may be necessary to hydrogenate them. In the preferred embodiment shown in the drawing, a hydrogenation step is included. If hydrogenation is unnecessary, valve 20 in line 18 is closed and the $C_4$ olefin alkylation feed is passed by lines 21 and 22 to the alkylation reactor 23.

Preferably, valve 20 remains in the open position and the $C_4$ olefin reaction product containing 1 to 25 volume percent butadiene with or without 0.5 to 4.0% oxygenated compounds is hydrogenated in reactor 24. Low temperature liquid phase saturation type hydrogenation is employed. Hydrogen is supplied to the reactor from any suitable source by line 25 and spent gas is removed by line 26 for removal of impurities and recycle. Hydrogenation temperatures in the range of 100 to 300° F. and pressures in the range of 100 to 1000 p.s.i.g. can be used. The preferred conditions for hydrogenation of butadiene to butenes are 100 to 300 p.s.i.g., 150° to 200° F., a space velocity of 1 to 5 v./v./hr. and a treat gas rate of 100 to 1000 s.c.f. $H_2$/bbl. The hydrogenation catalyst is conventional and it comprises a hydrogenation component such as the oxides and/or sulfides of the Group VI–B and/or Group VIII metals distended on a suitable support material such as alumina, silica-alumina, bauxite, kieselguhr and the like. A catalyst containing 0.3 weight percent platinum on activated alumina is the preferred catalyst.

Hydrogenation effluent comprising principally n-butenes is passed by line 22 into the alkylation reactor 23. An isobutane-containing stream is fed by lines 27 and 22 to the reactor. Alkylation catalyst is provided by line 28. Suitable catalysts include sulfuric acid, hydrogen fluoride, and slurry of crystalline aluminosilicate zeolites such as faujasites and mordenites exchanged with metals, ammonia and/or hydrogen. A preferred catalyst is sulfuric acid having a concentration of 90 to 96%. The olefin space velocity ranges from 0.2 to 1.0 v./hr./v.

Alkylation reaction effluent is passed by line 29 to settler 30, acid is withdrawn from the bottom of the settler for recycle by lines 31 and 28. Spent acid is removed from the system by line 32 for disposal or purification.

Acid-free alkylation effluent is passed by line 33 to light ends fractionator 34. From the fractionator a stream containing $C_3$ hydrocarbons and lighter hydrocarbons is recovered overhead for recycle by lines 35 and 1. Excess $C_3$ hydrocarbons are purged by line 36.

The effluent is passed by line 37 to fractionator 38. In this tower $C_4$ hydrocarbons are separated overhead by line 39. Alkylation product boiling up to about 375+° F. and comprising essentially isooctane and dimethylpentane is recovered from the process by line 40.

Fractionation tower 41 is an important unit in the process. It is used to separate iso $C_4$ paraffins from normal paraffins. The normal butane in the overhead from tower 41 is held in the range of 1%, so that the $C_4$ fraction is essentially pure isobutane for recycle to the alkylation reactor in a ratio of 2 to 8 moles isobutane per mole olefin feed. The isobutane content on the bottoms of tower 41 is also maintained in the range of 1% since in the subsequent oxydehydrogenation reaction it is converted to ethylene and propylene rather than the desirable butenes. Some of the butane bottoms may be used to vapor pressure the alkylate via line 42.

The isobutane overhead stream as well as the feed propane is passed by line 27 to alkylation zone 23. The n-butane and recycle propane stream is passed by line 1 to the oxydehydrogenation zone.

The integrated process of the invention provides a means of providing high quality olefin and isoparaffin components for alkylation from raw field and refinery $C_3$ to $C_4$ hydrocarbon streams that are now available. Use of the process in refining operations will relieve cat crackers from the requirement that they be operated to provide large quantities of olefins.

What is claimed is:

1. An integrated process for the preparation of alkylated hydrocarbons comprising the steps of:

(a) dehydrogenating a feed comprising $C_3$ and $C_4$ hydrocarbons in the presence of an oxygen-containing gas and a fluidized catalyst at a temperature of at least 850° F., said catalyst being selected from the group consisting of bismuth phosphate on activated alumina, vanadium oxide and bismuth oxide;

(b) separating an olefin fraction comprising $C_3$ and $C_4$ monoolefin hydrocarbons;

(c) contacting said olefin fraction with an isoparaffin hydrocarbon at alkylation conditions in the presence of an alkylation catalyst; and (d) recovering a branched chain paraffin alkylation product.

2. Process according to claim 1 in which the fluidized catalyst is continuously regenerated.

3. Process according to claim 1 in which the feed to step (a) contains a major amount of n-butane and in which step (a) is carried out in a fluidized catalyst transfer line reactor having a length to diameter ratio ranging from about 4 to about 50.

4. Process according to claim 1 in which the alkylation catalyst is selected from the group consisting of $H_2SO_4$, HF and crystalline aluminosilicate zeolites which have been exchanged with metals, ammonia and/or hydrogen.

5. An integrated process for the preparation of alkylated paraffin hydrocarbons comprising the steps of:

(a) fractionating a $C_3$–$C_4$ hydrocarbon fraction containing a major amount of $C_4$ hydrocarbons into a fraction comprising n-butane and a fraction comprising isobutane;

(b) subjecting the n-butane fraction to oxydehydrogenation in the presence of an oxygen containing gas and a fluidized catalyst comprising chromium phosphate on activated alumina;

(c) recovering from step (b) an olefin fraction comprising a major amount of butenes and a minor amount of butadiene;

(d) hydrogenating said butadiene in said olefin fraction in the liquid phase at a temperature in the range of 100° to 300° F. in the presence of a hydrogenation catalyst;

(e) recovering a butene fraction from step (d);

(f) contacting said butene fraction with the isobutane fraction from step (a) at alkylation conditions in the presence of $H_2SO_4$; and (g) recovering a branched chain paraffin alkylation product.

6. Process according to claim 5 in which the hydrogenation catalyst comprises a hydrogenation component selected from the group consisting of oxides of Group VI–B metals, oxides of Group VIII metals, sulfides of Group VI–B, sulfides of Group VIII metals, said component being distended on a support material.

7. Process according to claim 5 in which said fluidized catalyst is being continuously withdrawn, regenerated and introduced into said step (b).

References Cited

UNITED STATES PATENTS

| | | | |
|---|---|---|---|
| 2,312,539 | 3/1943 | Frey | 260—683.61 |
| 3,361,839 | 1/1968 | Lester | 260—683.3 |
| 3,306,950 | 2/1967 | Bajars | 260—680 D |

DELBERT E. GANTZ, Primary Examiner

G. J. CRASANAKIS, Assistant Examiner

U.S. Cl. X.R.

260—683.48, 683.59, 683.61